United States Patent Office

Re. 26,597
Reissued June 3, 1969

26,597

CEMENTITIOUS SYSTEMS

Augustus B. Small, Brussels, Belgium, and Henry Nash Babcock, Old Greenwich, Conn., assignors to Esso Research and Engineering Company, a corporation of Delaware No Drawing. Original No. 3,234,035, dated Feb. 8, 1966, Ser. No. 282,217, May 22, 1963. Application for reissue Jan. 12, 1968, Ser. No. 698,985
Int. Cl. C04b 7/02
U.S. Cl. 106—89 19 Claims

Matter enclosed in heavy brackets [ ] appears in the original patent but forms no part of this reissue specification; matter printed in italics indicates the additions made by reissue.

*ABSTRACT OF THE DISCLOSURE*

*Portland cement shrinkage is controlled or eliminated by incorporating fluid coke in the cement compositions. Improved control is achieved over that obtained using conventional aluminum or iron shrinkage-counteracting materials.*

This invention relates to improved cementitious systems and more particularly to concrete systems. More specifically, it relates to the use of a material which will control the shrinkage of a cementitious system without seriously degrading the strength of the final structure.

A great variety of cementitious systems or materials are in common use today. Perhaps the best known and most widely used of these materials is cement, particularly Portland cement. Portland cement is a tan to black powder manufactured by mixing and grinding a calcareous material such as limestone or chalk with an argillaceous material, i.e., clay. The mixture is then heated in an oven to about 1350–1800° C. at which time vitrification takes place. The clinker produced is pulverized, mixed with 2% gypsum, and ground to 200 mesh. Usually when used for concrete, 1 part of cement is mixed with 2 parts of fine aggregate, such as sand and 4 parts of a coarse aggregate such as gravel including crushed rock and stones. About six gallons of water are needed for each 100 pounds of cement.

Other commonly used cementitious materials include grout: a mixture of cement, water and fine aggregate, that is to say aggregate which will pass through a No. 4 sieve. Mortar is also in wide use as a cementitious material; this contains cement, lime, fine aggregate and water. Somewhat less commonly used is topping: a mixture of cement, fine aggregate and coarse aggregate. Fine aggregate includes sand and mineral particles of about 3/16" maximum diameter which pass through 1/4" mesh. Coarse aggregate includes mineral particles larger than 3/16" including all gravels and larger stones and crushed rocks. Other cementitious materials exist but no purpose would be served by merely listing them.

All of these cementitious materials have a common shortcoming; upon setting or curing the mass of the material is subjected to shrinkage. Shrinkage of concrete presents problems of design, long-term behavior, methods of reinforcement and over-all utility. Since concrete is the only inorganic thermosetting plastic which has been available to the builder at an attractive price, methods have been found to design around the shortcomings of concrete. Materials to counteract the shrinkage of concrete have been on the market for many years. Foremost among them are aluminum powders and the use of iron filings. Aluminum powder causes expansion by the formation of hydrogen which in turn forms minute voids in the concrete. By balancing the hydrogen release with the anticipated shrinkage of the mass, a nonshrinking concrete can be produced. With the aluminum powder technique, very careful control at all stages of concrete preparation is essential to yield the desired result. One of the problems is the need to measure and thoroughly mix very small quantities of aluminum powder under field conditions and by unskilled labor. In fact, a fraction of an ounce must be mixed for every ton of concrete.

Iron filings are used as a shrink counteracting material because as the iron rusts it expands, the expansion takes place during setting. However, this presents serious difficulties since the rusting may continue long after the desired time. This is particularly true if the concrete involved is directly exposed to outside weather conditions. With iron filings a temporary shrinkage occurs. After this the shrinkage of cement is counteracted by internal expansion during curing.

According to this invention, it has been found that the addition of a relatively small amount of fluid coke, that is to say coke recovered from the fluid coking of petroleum, to cement mixes will cause the system to expand during the setting rather than shrink. Expansion occurs between the initial and final set.

By controlling the amount of coke used, the cement system can be regulated to give a cement mass that neither shrinks nor expands and hence a non-shrinking Portland cement mixture can be produced.

The advantages of this discovery are apparent. The problems of level control as well as stresses and strains imposed by a shrinking system are virtually eliminated The shrinkage of the cementitious system is controlled by replacing a portion of the sand or fine aggregate with fluid coke. About 15 to 50% by volume of coke replacing sand in a system containing .1 to 2 weights Portland cement, to 2 to 4 weights fine aggregate to 2 to 5 weights of coarse aggregate will yield a system that is essentially of constant volume during cure. All or part of the fine aggregate may be replaced by fluid coke. The amount of fluid coke added to cement mixes, such as Portland cement, coarse aggregate and fine aggregate may be between 0 to 100 wt. percent of the fine aggregate depending on the degree of expansion desired.

Still further advantages result from the lower density of the cement system or mixture. Coke has a bulk density of about 60 lbs./cu. ft. and a real density of about 92 lbs./cu. ft. By contrast, sand has a bulk density of about 100 lbs./cu. ft. and a real density of about 165 lbs./cu. ft.

This ability to expand Portland cement in a controlled manner is limited exclusively to fluid coke; no other type of coke or carbon has this effect. It should be noted that coal clinkers may also cause expansion but in a harmful and uncontrolled amount. In the clinker case, the expansion is related to the sulfur content.

The behavior of fluid coke in cementitious systems is believed to be due to its inherent ability to adsorb small amounts of inert gases which can be released by the heat generated by the setting concrete.

There has recently been developed an improved process known as the fluid coking process for the production of fluid coke and the thermal conversion of heavy hydrocarbon oils to lighter fractions. See Pfeiffer et al. Patent 2,881,130 granted Apr. 7, 1959. The fluid coking unit consists basically of a reaction vessel or coker and a heater or burner vessel. In a typical operation the heavy oil to be processed is injected into the reaction vessel containing a dense turbulent fluidized bed of hot inert solid particles, preferably coke particles. A transfer line or staged reactors can be employed. Uniform temperature exits in the fluid coking bed. Uniform mixing in the bed results in virtually isothermal conditions and effects instantaneous distribution of the feed stock.

In the reaction zone the feed stock is partially vaporized and partially cracked. Product vapors are removed from the coking vessel and sent to a fractionator for the recovery of gas and light distillates therefrom. Any heavy bottoms are usually returned to the coking vessel. The coke produced in the process remains in the bed coated on the solid particles. Stripping steam is injected into the stripper to remove oil from the coke particles prior to the passage of the coke to the burner.

The heat for carrying out the endothermic coking reaction is generated in the heater or burner vessel, usually but not necessarily separate. A stream of coke is transferred from the reactor to the burner vessel, such as a transfer line or fluid bed burner, employing a standpipe and riser system; air being supplied to the riser for conveying the solids to the burner. Sufficient coke or other carbonaceous matter is burned in the burning vessel with an oxygen-containing gas to bring the solids therein up to a temperature sufficient to maintain the system in heat balance.

The burner solids are maintained at a higher temperature than the solids in the reactor. About 5% of the coke, based on the feed, is normally burned for this purpose. This may amount to approximately 15% to 30% of the cake made in the process. The unburned portion of the coke represents the net coke formed in the process and is partially recycled to the reactor, the remainder being withdrawn.

Heavy hydrocarbon oil feeds suitable for the coking process include heavy crudes, atmospheric and crude vacuum bottoms, pitch, asphalt, other heavy hydrocarbon petroleum residue or mixtures thereof. Typically such feeds can have an initial boiling point of about 700° F. or higher, an A.P.I. gravity of about 0° to 20°, and a Conradson carbon residue content of about 5 to 40 wt. percent. (As to Conradson carbon residue see A.S.T.M. Test D-180-52.)

It is preferred to operate with solids having a particle size ranging between 100 and 1000 microns in diameter with a preferred average particle size range between 150 and 400 microns. Preferably not more than 5% has a particle size below about 75 microns, since small particles tend to agglomerate or are swept out of the system with the gases. The withdrawn product coke has a diameter predominantly in the range of about 20 to 200 mesh, i.e., about 80 to 95 weight percent.

It is preferred to use fluid coke in the size range of about 100% through 20 mesh but any size up to 3/16" will produce satisfactory results.

The coke used may be either green fluid coke or calcined fluid coke. For a description of green fluid coke see British Patent No. 819,588. The cementitious materials described in this invention may be utilized for a great variety of purposes such as the making of bricks, blocks, floors and walls as well as reinforced concrete structures.

Of particular interest in the manufacture of a plastic composition which may be utilized in the production of cement blocks. The plastic composition would consist of about 1 part by weight of Portland cement in admixture with between .1 to 4 parts by weight of fine aggregate. Coarse aggregate would be present in an amount between about 1 and 6 parts by weight, water is added in the amount of .3 to 1.0 part by weight and fluid coke in the amount of .1 to 3 parts by weight. The fluid coke is preferably of a dimension so that 100% passes through a 20 mesh screen, but all mesh sizes are usable from commercial fluid cokers. However, no coke particles should be larger than 3/16".

This mixture is placed in a plastic mold to harden, the mold being of any desired shape and at the end of 24 hours a cement block is removed. The process may be speeded up by using additives which increase the cure rate of concrete utilizing an injection process, the setting time will be a small fraction of a minute.

In order to obtain a substantially nonshrinking mixture, fluid coke in the amount of 10 to 20 wt. percent of the fine aggregate should be added. The fluid coke would represent about 25 to 35 wt. percent based on the amount of Portland cement in the mixture. Although no definite upper limit to the size of fluid coke particles need be set, it is highly desirable to work with fluid coke which is under 3/16" in size.

Since the coke cementitious mass expands against the mold, the manufactured block will have excellent dimensional stability—a factor of great importance in its use in construction.

The following experiments were carried out by making mixtures of cementitious materials. The Portland cement, coarse aggregate, fine aggregate and fluid coke mixture was mixed with water. The order of mixing did not have an effect on the outcome; some of the various mixing techniques will be described in detail.

The mixtures were stirred in a cement mixer and poured into a cylinder which was 36" high and 1" in diameter; the shrinkage, expansion or constant size of the mixture was then observed.

In all of the following tables the term "sack" refers to 95 lbs. of material. The fine aggregate used was sharp, clean Ottawa sand. In all experiments green fluid coke was the source of fluid coke.

TABLE I.—FLUID COKE CAUSES EXPANSION

| Exp. No. | System Composition, Pts. By Wt. | | | | Change in Cast Cylinder Height [a] | | | | Water Bleeding, In.[c] | | Remarks |
|---|---|---|---|---|---|---|---|---|---|---|---|
| | Fluid Coke −20 Mesh [b] | Sand | Portland Cement | Water | Inches | | Percent | | 1 Day | 1 Wk. | |
| | | | | | 1 Day | 1 Wk. | 1 Day | 1 Wk. | | | |
| 1 | 1.6 | -------- | 1.0 | 0.86 | +1.50 | +1.50 | +4.2 | +4.2 | 0.88 | 0.75 | Coke plus water plus cement. |
| 2 | 1.6 | -------- | 1.0 | 0.86 | −0.75 | −0.75 | −2.1 | −2.1 | None | None | Evacuated coke at 100° F. for 1 hr. to 1 p.s.i.a. Then added water to break vacuum. Wet coke used. |
| 3 | 1.6 | -------- | 1.0 | 0.86 | +1.50 | +1.50 | +4.2 | +4.2 | 0.75 | 0.63 | Evacuated cake, exposed overnight before use.[d] |
| 4 | -------- | 3 | 1.0 | 0.86 | −0.38 | −0.63 | −1.1 | −1.8 | 0.25 | None | Sand volume equal to coke volume in other experiments. |

[a] Cast 36" high, 1" diameter cylinder (Polypropylene pipe).
[b] Through 20 mesh.
[c] Accumulation of water on top of cementitious mass.
[d] By exposed it is meant that the coke was spread so that maximum contact with the atmosphere would take place.

Table I illustrates the expansive effect produced by fluid coke in admixture with cement. The order of addition does not influence the behavior of the fluid coke. In Exp. 1, the coke and cement were mixed together and the water was added to complete the formulation. In Exp. 2, the coke and water were mixed and then the cement was added to complete the formulation. A third experiment (Exp. 3) produced an expansion when the cement and water were first mixed and the coke then added to complete the formulation. The order of mixing therefore, has no memorable effect on the properties of the formulation. In the second experiment (Exp. 2) the cake has first been evacuated and then water was added to break the vacuum. The net result was shrinkage of 0.75 inch. In Exp. 3 the coke was again evacuated but this time was exposed overnight; at atmospheric pressure and as a result air become re-entrained inthe coke. The coke caused expansion in the Portland cement mixture. In the final experiment (Exp. 4) no coke was used; the filler or fine aggregate was sand exclusively. Consequently after a day, a shrinkage of 0.38 inch took place and after one week it was 0.63 inch.

The set cement mixtures containing fluid coke, sand, aggregate and Portland cement were off-white in color.

The behavior of the evacuated coke indicates that the ability of fluid coke to counteract the shrinkage of cementitious systems during cure is due to the surprising property of being able to desorb normally held gases under curing conditions. This is especially surprising since no bubbling occurs, nor are objectionable voids formed in the cementitious mass. The exact mechanism is not known but it appears to be a controlled desorption.

TABLE II.—EFFECT OF CARBONACEOUS AGGREGATE ON GROUT SHRINKAGE

| Exp. No. | System Composition, Parts by Weight | | | | | | | 7 Day Variation from Cast Height, Inches |
|---|---|---|---|---|---|---|---|---|
| | Fluid Coke −20 Mesh | Fluid Coke Powdered [b] | Delayed Coke | Carbon Black | Sand | Portland Cement | Water | |
| 1 | 1.6 | | | | | 1.0 | 0.575 | +0.44 |
| 2 | 1.6 | | | | | 1.0 | 0.76 | +0.56 |
| 3 | 1.6 | | | | | 1.0 | 0.87 | +0.50 |
| 4 | | 1.6 | | | | 1.0 | 1.15 | +0.31 |
| 5 | | | 1.6 | | | 1.0 | 0.575 | −0.06 |
| 6 | 0.8 | | 0.8 | | | 1.0 | 0.575 | +0.25 |
| 7 | | | | 1.6 | | 1.0 | 3.45 | −0.25 |
| 8 | | | | | 1.6 | 1.0 | 0.575 | [a] −0.38 |

[a] High shrinkage results from low volume of sand used.
[b] 100% through a 320 mesh screen (~44 microns).

Table II is a comparison of the effects of fluid coke versus delayed coke, carbon black and sand. For a description of delayed coke see Nelson et al. Patent 2,835,605, granted May 20, 1958.

As illustrated by Table II, the fluid coke used in Exps. 1, 2, 3, 4 and 6 produced an expansion. In Exp. 6 the expansion was less and this was due to the fact that the fluid coke and delayed coke together represented 1.6 parts by weight. The delayed coke used in Exp. 5 resulted in shrinkage. In the same fashion, the carbon black of Exp. 7 and the sand of Exp. 8 both resulted in shrinkage.

The failure of carbon black to cause expansion is rather surprising. Carbon black is known to be a highly surface active material. Carbon black is readily wet by water and, in view of the results with fluid coke, it might be expected that excessive expansion would take place. Not only did no expansion take place, but the systems shrank 0.25 inch.

Delayed coke has a chemical composition very close to fluid coke, yet delayed coke did not produce expansion but behaved in the same inert manner that sand does.

TABLE III.—SYSTEM COMPOSITION PARTS BY WEIGHT

| | 0% Coke | 15% Coke | 50% Coke | 100% Coke | 100% Coke |
|---|---|---|---|---|---|
| 7-Day Strength (Compression) | 2,827 p.s.i. | 3,427 p.s.i. | 2,190 p.s.i. | 601 p.s.i. | 675 p.s.i. |
| 28-Day Strength (Compression) | 4,151 p.s.i. | 4,875 p.s.i. | 2,739 p.s.i. | 742 p.s.i. | 813 p.s.i. |
| Density (Lbs./C.F.) | 146 | 145 | 137 | 120 | 116. |
| 1-Day Height Change | −3/16" | None | None | +1" | +15/16". |
| Coke/Cement Ratio (Lbs./Sack) | | 16.10 | 66.25 | 132.68 | 132.68. |
| Water/Cement Ratio (Gal./Sack) | 6¼ | 6¼ | 6¼ | 6 | 6. |
| Coke/Water Ratio (Lbs./Gal.) | | 2.58 | 10.60 | 22.11 | 22.11. |
| Sand/Cement Ratio (Lbs./Sack) | 222 | 194.5 | 111 | | |

NOTES:
In the compositions in Table III, it is obvious that the water/cement ratio is about 6 gal./100 pounds of cement.
Percent Coke indicates the percent of sand volume replaced by coke.

Table III illustrates the effect of varying the amount of fluid coke to be added to sand-cement mixtures. At 0% fluid coke there is considerable shrinkage; between 15% and 50% fluid coke by volume of the fine aggregate results in a mixture which essentially does not shrink nor expand. A concentration of 100% coke (no sand) causes distinct expansion. As for strength, 15% fluid coke actually produces a stronger material than 0% fluid coke (100% sand or fine aggregate). At 50% fluid coke there is a decrease in strength. However, the cement is still satisfactory for most purposes. At 100% fluid coke the strength is reduced to 675 p.s.i.

This reduction in strength at 100% fluid coke may be remedied by utilizing a mixture of fluid and delayed coke as in Table IV.

TABLE IV.—SYSTEM COMPOSITION PARTS BY WEIGHT

| | Experiment 1 100% Coke (50% Delayed 50% Fluid) 5% Air | Experiment 2 100% Fluid Coke |
|---|---|---|
| 7-Day Strength (Compression) | 3357 p.s.i. | 707 p.s.i. |
| 28-Day Strength (Compression) | 4063 p.s.i. | 353 p.s.i. |
| Density (Lbs./C.F.) | 131 p.s.i. | 123 p.s.i. |
| 1-Day Height Change | +9/16" | +1". |
| Coke/Cement Ratio (Lbs./Sack) | 90.98 | 115.23. |
| Water/Cement Ratio (Gal./Sack) | 5 | 6½. |
| Coke/Water Ratio (Lbs./Gal.) | 18.45 | 17.43. |

NOTES:
5% indicates ¼ ounce Darex air entraining agent/gal. of water.
Percent coke indicates the percent of sand volume.

Table IV illustrates the effects on expansion and strength of adding to a cement mixture 100% fluid coke in contrast to a 100% coke mixture comprising 50% fluid coke and 50% delayed coke.

In Experiment 1 a mixture of delayed coke and fluid coke was utilized. Seven-day strength was 3357 p.s.i. and 28-day strength was 4063 p.s.i.

In Experiment 2 the fine aggregate was replaced entirely by fluid coke. This mixture was considerably weaker: seven-day strength was 707 p.s.i. and 28-day strength was reduced to 353 p.s.i.

Mixtures of 15 to 70% fluid coke and 30 to 85% delayed coke may also be employed.

As one would expect from the above, other cementitious systems such as topping, grout and mortar may also be made essentially nonshrinking. This may be accomplished by replacing about 15 to 50% by volume of the fine aggregate content of either topping, grout or mortar with fluid coke. The exact amount of fluid coke to be utilized will vary somewhat with the other ingredients of the cementitious system.

TABLE V.—TOPPING

| Group Designation 1-2-4 | 0 Parts Coke | 1 Part Coke |
|---|---|---|
| 7-Day Strength (Compression) | 2,456 p.s.i. | 2,403 p.s.i. |
| 28-Day Strength (Compression) | 3,886 p.s.i. | 3,427 p.s.i. |
| Density (Lbs./C.F.) | 144 | 140. |
| 1-Day Height Change | −1/64" | None. |
| Coke/Cement Ratio (Lbs./Sack) | | 66.24. |
| Water/Cement Ratio (Gal./Sack) | 6½ | 6½. |
| Coke/Water Ratio (Lbs./Gal.) | | 10.60. |
| Sand/Cement Ratio (Lbs./Sack) | 222 | 111. |

NOTES:
Group designation 1-2-4 indicates proportions by volume of cement, sand and ⅜" blue stone.
Parts coke indicates the portions of sand replaced by coke by volume.

Table V indicates that the effect of fluid coke on topping, another cementitious material, is the same as concrete. The addition of 50% fluid coke resulted in no expansion and only a slight loss in strength. By contrast, a 1-day height change of minus 1/16 inch resulted when no fluid coke was added.

Coke behavior correlates closely with the total non-cement components in the formulations. In the above Table V, the use of coke represents about 16 vol. percent of the non-cement components and the system is non-shrinking.

Table VI illustrates the effects of adding fluid coke to grount. The addition of 3/16 part of fluid coke resulted in a grout which produced no shrinkage at all. Grout with no fluid coke added had a 1-day height change of minus ¼ inch. The strength of the grout increased with the addition of the 3/16 part fluid coke.

The increase in strength with relatively small portions of fluid coke is probably due to the fine fluid coke filling in the crevices between the larger sand particles. However, in spite of the potentially better packed fine aggregate the system still was capable of expanding. As the concentration of fluid coke is increased the fluid coke takes over a larger portion of the direct load. The loss in strength at 1½ parts fluid coke is probably due to the excessive quantity of fines. Sand with too much fine coke gives lower strength systems.

TABLE VI.—GROUT

| Group Designation 1½ | 0 Parts Coke | 3/16 Part Coke | ¾ Part Coke | 1½ Parts Coke |
|---|---|---|---|---|
| 7-Day Strength (Compression) | 3,992 p.s.i. | 4,522 p.s.i. | 3,357 p.s.i. | 901 p.s.i. |
| 28-Day Strength (Compression). | 5,511 p.s.i. | 5,794 p.s.i. | 4,734 p.s.i. | 1,237 p.s.i. |
| Density (Lbs./C.F.) | 130 | 129 | 115 | 89. |
| 1-Day Height Change | −¼ | None | Confined* | Confined.* |
| Coke/Cement Ratio (Lbs./Sack). | | 11.67 | 51.21 | 102.65. |
| Water/Cement Ratio (Gal./Sack). | 5 | 4½ | 5 | 5¼. |
| Coke/Water Ratio (Lbs./Gal.) | | 2.54 | 10.37 | 19.22. |
| Sand/Cement Ratio (Lbs./Sack). | 158 | 138.25 | 79 | |

NOTES:
Group designation 1½ indicates proportion by volume of cement and sand.
Parts coke indicates the divers portions of sand replaced by coke on a volume basis.
*The mixture was confined by sealing off the ends of the cylinder.

TABLE VII.—MORTAR

| Group Designation 1-1-6 | 0 Parts Coke | ½ Part Coke | 1 Part Coke |
|---|---|---|---|
| 7-Day Strength (Compression) | 388 p.s.i. | 389 p.s.i. | 318 p.s.i. |
| 28-Day Strength (Compression) | 636 p.s.i. | Broke | 495 p.s.i. |
| 45-Day Strength (Compression) | | 544 p.s.i. | |
| Density (Lbs./C.F.) | 123 | 121 | 119. |
| 1-Day Height Change | −⅛" | None | +⅛". |
| Coke/Cement Ratio (Lbs./Sack) | | 33.19 | 63.84. |
| Water/Cement Ratio (Gal./Sack) | 13 | 16 | 15. |
| Coke/Water Ratio (Lbs./Gal.) | | 207 | 419. |
| Sand/Cement Ratio (Lbs./Sack) | 650 | 620 | 563. |

NOTES:
Group designations 1-1-6 indicate proportions of cement, lime and sand, by volume.
Parts coke indicates the divers portions of sand replaced by coke on a volume basis.
The mixes were batched in a laboratory and sufficient water was added for workability.

In Table VII mortar was utilized. As expected, the height change with no fluid coke added was negative. With ½ part fluid coke there was no height change. One part fluid coke resulted in a slight expansion. The fluid coke in this experiment represents a very small portion of the total mix—about 6 vol. percent in column 2 and about 12 vol. percent in column 3—so it is surprising that the results obtained show no shrinkage in column 2 and some expansion in column 3. These data emphasize the fact that fluid coke behaves in a similar manner in all cementitious systems but each system must be formulated depending on the type and amount of non-cement components.

Other obvious areas where fluid coke may be employed are reinforced concrete and molded panels.

SIEVE ANALYSIS OF SOME COMMERCIAL FLUID COKES

| Sieve Mesh | Percent Retained on Sieve | | |
|---|---|---|---|
| | A | B | C |
| 10 | 2.8 | 2.8 | 5.0 |
| 20 | 0.7 | 0.8 | 1.6 |
| 60 | 27.8 | 14.0 | 19.2 |
| 80 | 26.2 | 28.3 | 34.2 |
| 100 | 11.0 | 13.0 | 12.1 |
| 140 | 17.6 | 20.0 | 16.2 |
| 200 | 10.3 | 15.2 | 8.0 |
| Pan | 3.6 | 5.0 | 3.0 |
| Loss [1] | 0.3 | 0.9 | 0.7 |

[1] During sieving.

Fluid coke has the following characteristics:

| | |
|---|---|
| Volatile matter (wt. percent on coke) at 1100° F. | 0.5 to 1.3 |
| Carbon (wt. percent) | 88–93 |
| Hydrogen (wt. percent) | 1.5–2.0 |
| Sulfur (wt. percent) | 1–7 |
| Ash (wt. percent) | 0.3–0.8 |

What is claimed is:

1. A dry Portland cement composition [which sets hard on standing and does not shrink when mixed with water in the ratio of about 6 to 6¼ gallons of water per 94 parts by weight of Portland cement and allowed to set and] which contains between about 16.10 and about 132.68 parts by weight of fluid coke particles and between about 0 and 194.5 parts by weight of sand per 94 parts by weight of Portland cement, said fluid coke particles being less than 3/16" in size and mostly between about 20 and 200 mesh.

2. A dry Portland cement composition [which sets hard on standing and which does not shrink when mixed with water in the ratio of about 6¼ gallons of water per 94 parts by weight of Portland cement and allowed to set and] which contains between about 16.10 and about 66.25 parts by weight of fluid coke particles per 94 parts by weight of Portland cement, and between about 111 and about 194.5 parts by weight of sand per 94 parts by weight of Portland cement, said fluid coke particles being less than 3/16" in size.

3. A mortar mix composition including Portland cement, sand and fluid coke particles in the following proportions, fluid coke to Portland cement between about 33.19 and 63.84 parts by weight to 94 parts by weight of Portland cement, and between about 620 parts by weight and 563 parts by weight of sand to 94 parts by weight of Portland cement.

4. A plastic composition which when mixed with water sets hard on standing but which does not shrink on setting and which is useful for making cement blocks, cement floors or walls, and reinforced concrete structures which includes an admixture of 1 part by weight Portland cement with fine aggregate in an amount between about 0.1 to 4 parts by weight, coarse aggregate in an amount between about 1 and 6 parts by weight, water in an amount between about 0.3 to 1.0 by weight, and fluid coke in an amount between about .1 and 3 parts by weight, the fluid coke being of a size predominantly in the range between about 20 and 200 mesh and being the sole shrink counteracting ingredient.

5. A cement composition which when mixed with about 0.575 part by weight of water per part by weight of Portland cement sets hard on standing and does not shrink and which contains about 1 part by weight of Portland cement, 0.8 part by weight of fluid coke particles smaller than 20 mesh, and 0.8 part by weight of delayed coke particles, the fluid coke particles being the sole shrink-counteracting ingredient added to the composition.

6. A composition which comprises 1 part by weight of Portland cement, 0.8 part by weight of fluid coke particles and 0.8 part by weight of delayed coke.

7. A process for making a cementitious composition which comprises mixing Portland cement with sand and fluid coke particles, said sand being in a weight ratio between about 138.25 and about 79.0 to 94 parts by weight of Portland cement, and said fluid coke particles being in a weight ratio of between about 11.67 and about 51.21 to 94 parts by weight of Portland cement, said fluid coke particles being of a size smaller than about 3/16".

8. A process for the manufacture of a concrete product which does not shrink on setting which comprises mixing 1 part by weight of Portland cement, between about 0.1 to 4 parts by weight of sand, between about 1 and 6 parts by weight of coarse aggregate, fluid coke particles in an amount of about 25 to 35 weight percent based on the amount of Portland cement in the mixture, about 6 gallons of water per 100 pounds of Portland cement in the mixture, placing the mixture in a mold and permitting the mixture to set and harden.

9. A process for making a mortar mix which will not shrink on setting after being mixed with water and which comprises mixing Portland cement, lime and sand in proportions of 1–1–6 by volume and fluid coke particles, the amount of fluid coke particles being between about 6 volume percent and 12 volume percent of the total mix.

10. An improved set concrete block made from a dry mixture which when mixed with about 0.1 to 3 parts by weight of water sets without shrinking and which dry mixture includes 1 part by weight of Portland cement, 0.1 to 4 parts by weight of fine aggregate, 1 to 6 parts by weight of coarse aggregate, and 0.1 to 3 parts by weight of fluid coke particles of less than 3/16" in size, said fluid coke particles being the sole added shrink-counteracting ingredient.

11. A cement block made from a plastic molded mixture which does not shrink upon setting and hardening, said plastic mixture containing about 1 part by weight of Portland cement, about 0.1 to 4 parts by weight of sand, about 1 to 6 parts by weight of coarse aggregate, about 0.3 to 1.0 part by weight of water and between about 25 and 35 weight percent of fluid coke particles based on the amount of Portland cement in said plastic mixture, said fluid coke particles being of a size less than about 3/16" in diameter and being the sole shrink counteracting ingredient in the plastic mixture.

12. A cement block as defined in claim 11 wherein said fluid coke particles are mostly of a size between about 20 mesh and 200 mesh.

13. A set article formed from a wet plastic mixture which expands upon setting and hardening, said wet plastic mixture containing about 1 part by weight of Portland cement, and about 1.6 parts by weight of fluid coke particles, said fluid coke particles being of a size less than about 3/16" in diameter and being the sole expanding ingredient added to the plastic mixture.

*14. A process for improving Portland cement compositions comprising incorporating in said compositions fluid coke in an amount sufficient to enable the compositions to set without shrinking or expanding.*

*15. A process for improving Portland cement compositions which comprises incorporating in said compositions fluid coke in an amount sufficient to cause expansion of the compositions upon setting.*

*16. A composition comprising Portland cement and fluid coke, said fluid coke being present in an amount sufficient to cause expansion of the composition upon setting.*

*17. A composition comprising Portland cement and fluid coke, said fluid coke being present in an amount sufficient to enable the composition to set without shrinking or expanding.*

*18. A composition for use in the construction industry and which, when mixed with water, hardens and sets without shrinking, which includes about 1 part by weight*

*of Portland cement, about 1.1 to 9 parts by weight of mineral aggregate and 0.1 to 3 parts by weight of fluid coke particles of a size less than about 3/16", said fluid coke particles being the sole shrink counteracting ingredient added to the composition.*

*19. A composition comprising Portland cement and fluid coke, said fluid coke consisting of particles less than about 3/16 inch in size in amounts sufficient to lessen the shrinkage of said composition upon mixing with water and curing compared to the shrinkage occurring when an otherwise identical composition having the fluid coke replaced by an equal volume of fine aggregate is so cured.*

References Cited

The following references, cited by the Examiner, are of record in the patented file of this patent or the original patent.

UNITED STATES PATENTS

| | | | |
|---|---|---|---|
| 1,772,149 | 8/1930 | Jolitz | 106—97 |
| 1,805,431 | 5/1931 | Ryder | 106—97 |
| 2,609,882 | 9/1952 | Morgan et al. | 106—97 |
| 2,881,130 | 4/1959 | Pfeiffer et al. | 208—157 |
| 3,102,039 | 8/1963 | Manecke | 106—97 |

FOREIGN PATENTS

4632/1894 1/1895 Great Britain.

TOBIAS E. LEVOW, *Primary Examiner.*

W. T. SCOTT, *Assistant Examiner.*

U.S. Cl. X.R.

106—97, 98